United States Patent [19]

Binnie et al.

[11] 3,899,774

[45] Aug. 12, 1975

[54] INTERROGATION OF REMOTE STATIONS

[75] Inventors: Alexander J. Binnie, Luton; Kenneth Bowdell, Shefford; Philip James Clark, Luton, all of England

[73] Assignee: George Kent Ltd., Luton, England

[22] Filed: May 4, 1973

[21] Appl. No.: 357,111

[30] Foreign Application Priority Data

May 4, 1972 United Kingdom ............... 20785/72

[52] U.S. Cl. .............. 340/163; 340/151; 340/147 P

[51] Int. Cl.² ........................................ H04Q 11/00

[58] Field of Search .... 340/151, 147 P, 163, 152 R, 340/152 T; 179/2 R

[56] References Cited

UNITED STATES PATENTS

| | | | |
|---|---|---|---|
| 3,484,694 | 12/1969 | Brothman | 340/151 X |
| 3,553,376 | 1/1971 | Bogaart | 340/151 X |

*Primary Examiner*—Harold I. Pitts

*Attorney, Agent, or Firm*—Browdy and Neimark

[57] ABSTRACT

An apparatus for reading remote sources of information, such as meters, is located at a remote station and is operated by interrogation signals transmitted via a telephone line from an interrogator at a local exchange. The apparatus includes a primary route selector and secondary route selectors connected to respective outputs of the primary route selector. Each secondary route selector has a plurality of outputs, to each of which at least one meter reading circuit is connected. The primary route selector detects a first interrogation signal, coded with information representing a predetermined secondary route selector, and provides an electrical path to that secondary selector for subsequent signals. A second interrogation signal is applied to the predetermined secondary selector to provide an electrical path for subsequent signals to a predetermined output thereof. Finally, a predetermined reading circuit, connected to the predetermined output of the secondary selector and represented by coded information in a third interrogation signal, reads the associated meter and transmits the reading back to the local exchange.

6 Claims, 3 Drawing Figures

INTERROGATION OF REMOTE STATIONS

RELATED APPLICATIONS

Our co-pending U.K. Patent Application 14638/71 discloses a remote meter reading system in which a remote reader at a consumer's premises is activated to read one or more meters by an interrogator connected thereto by a line. Reading is normally effected via the public switched telephone network, in which case the said line is the consumer's telephone line.

BACKGROUND OF THE INVENTION

This invention relates to the reading of information available at remote stations, for example the reading of utility meters at consumer premises.

The reader disclosed in the said application is arranged for reading up to four meters, e.g. meters registering the consumption of fuel oil, water, gas and electricity, which is adequate for the average domestic consumer premises. However, it sometimes happens that a large number of meters may be situated together, e.g. in industrial premises or in a block of flats, and it may be convenient to have reading access to them all via a single line.

There also exist circumstances in which it is desirable to have reading access over a single line to a large number of sources of information, not necessarily meters, concentrated in a small area, e.g. in the collection of a number of readings from instruments at an unattended process plant or part thereof.

In modern housing developments it is not uncommon for each living unit to be wired ready for a telephone, even if one is not rented, and installation of a telephonic remote meter reading system is therefore fairly straightforward as a reader of the type disclosed in our said co-pending application can be installed in each living unit. However, in an established area in which there is low penetration of telephone lines, the cost of wiring each house to the telephone system and of installing extra terminal equipment for the new lines at the telephone exchange may well be prohibitive. In this connection, it should be realised that in the present state of development of the art the cost benefit margin of automatic remote meter reading as opposed to manual reading is small, and therefore the large cost of such a wiring programme would very likely render installation of a telephonic system non-viable. There is therefore a need for a reading arrangement with which, in areas of this type, meters in several consumer's premises can be read over a single line. For example, if in a given area for every telephone line there are an average of, say, twenty houses each having an average of, say, three meters, it is desirable that a single remote reading apparatus adapted to read at least sixty meters be provided so that the area can have a remote meter reading system installed without the need for the provision of any fresh telephone lines.

Accordingly it is an object of the present invention to provide apparatus adapted for reading a large number of sources of information, e.g. meters, in response to an interrogation signal received from a line.

The invention therefore provides apparatus responsive to the receipt of a coded interrogation signal from an interrogator connected thereto by a line to read a selected one of a plurality of available sources of information and to transmit back to the interrogator over the line a coded response signal containing information from the selected source, the apparatus including route selector gating means having an input connected to receive the interrogation signal and responsive to the interrogation signal coding to connect the input to a selected one of a plurality of outputs thereof, and at least one reading circuit adapted to read a respective associated source of information, if instructed by the interrogation signal coding, connected to each of the outputs of the route selector gating means.

If the route selector gating means has eight outputs each connected to up to four reading circuits, any one of up to 32 sources of information can be selectively read from a single line, contact with a selected source being established by the interrogator transmitting a first code to select the route leading to the source and a second code to select the particular source desired.

The apparatus may be extended to read a larger number of meters by the use of a primary route selector having each of its outputs connected to the input of a respective secondary route selector which in turn has at least one reading circuit connected to each of a plurality of outputs. In an example similar to that given above, any of up to 256 sources of information ($8 \times 8 \times 4$) can be accessed by a single line by transmission of three codes.

The number of meters that can be read by the apparatus can be increased indefinitely by adding in tertiary route selectors and so forth, the maximum number of meters accessible being determined by technical and economic limiting factors.

By employing the present invention, reading apparatus can be custom-built to particular requirements by simply interconnecting standard route selectors and reading circuits to the required configuration.

Apart from rendering remote meter reading in low telephone penetration areas and the reading of large concentrations of meters and/or other information sources more practicable, the present invention has other advantages. One of these is that the reading operation is speeded up. As the transmission of an interrogation signal and the return of a meter reading response signal can take place at "electronic" speeds, while the establishment of contact with the reading apparatus by dialling the associated telephone number has to take place at an "electro-mechanical" speed for compatability with present-day exchange equipment, increasing the number of meters read per dialling operation considerably reduces the total time taken for each meter reading.

BRIEF DESCRIPTION OF THE DRAWINGS

The invention will now be described, by way of example, with reference to the accompanying drawings, in which:-

DETAILED DESCRIPTION

Figure 1:
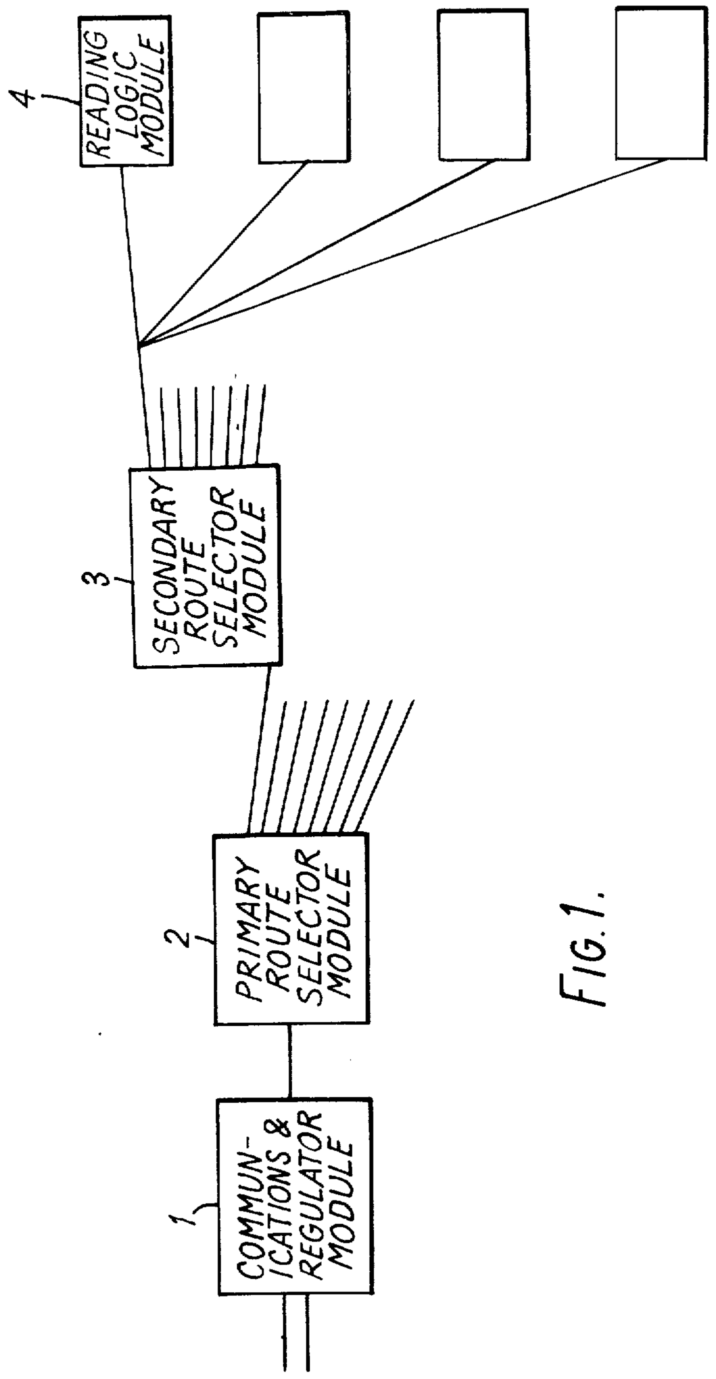
FIG. 1 is a schematic diagram of a remote meter reading apparatus according to the invention.
Figure 2:
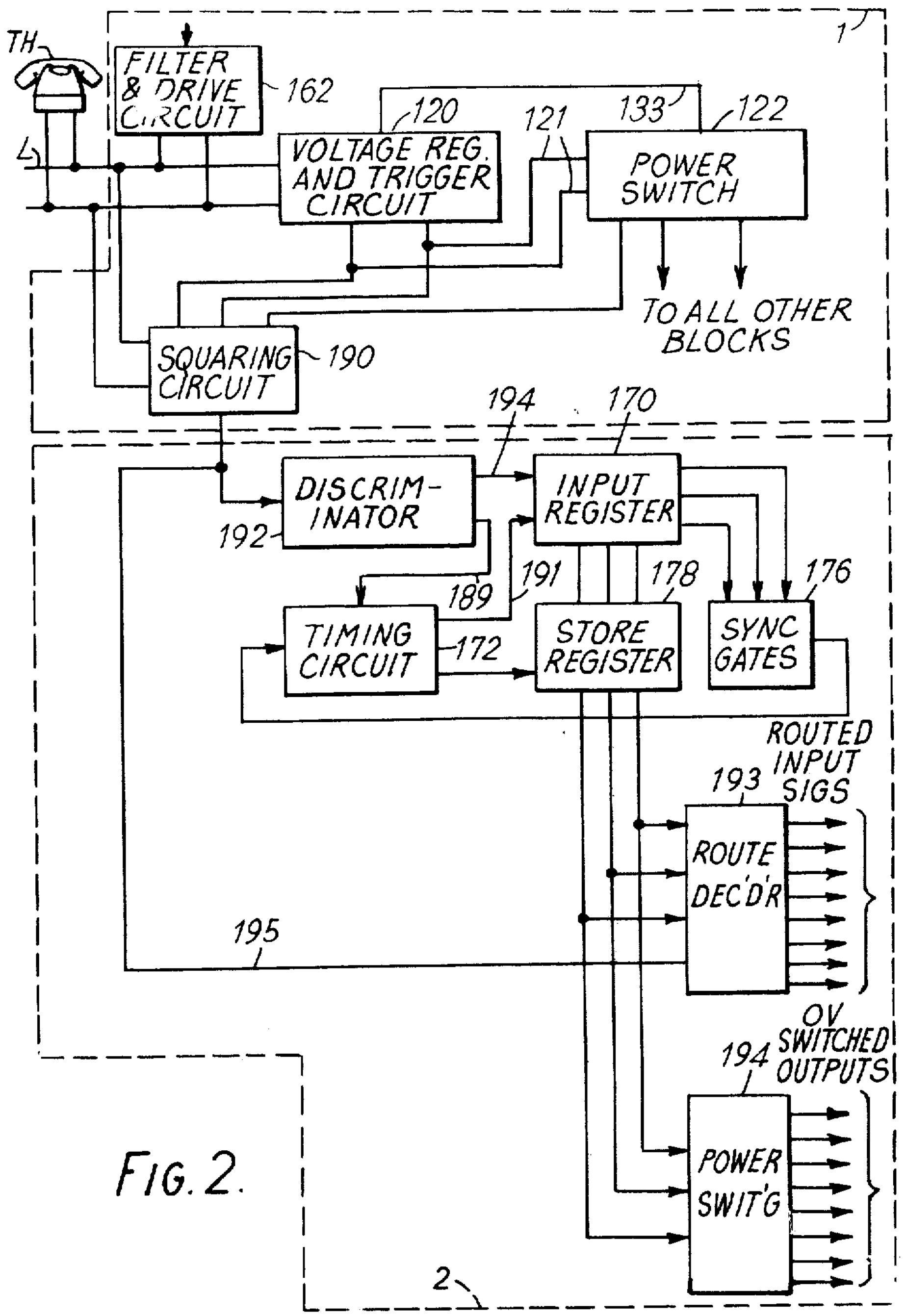
FIG. 2 is a schematic diagram of a communication and regulator module and a primary selector module in the apparatus of FIG. 1.
Figure 3:
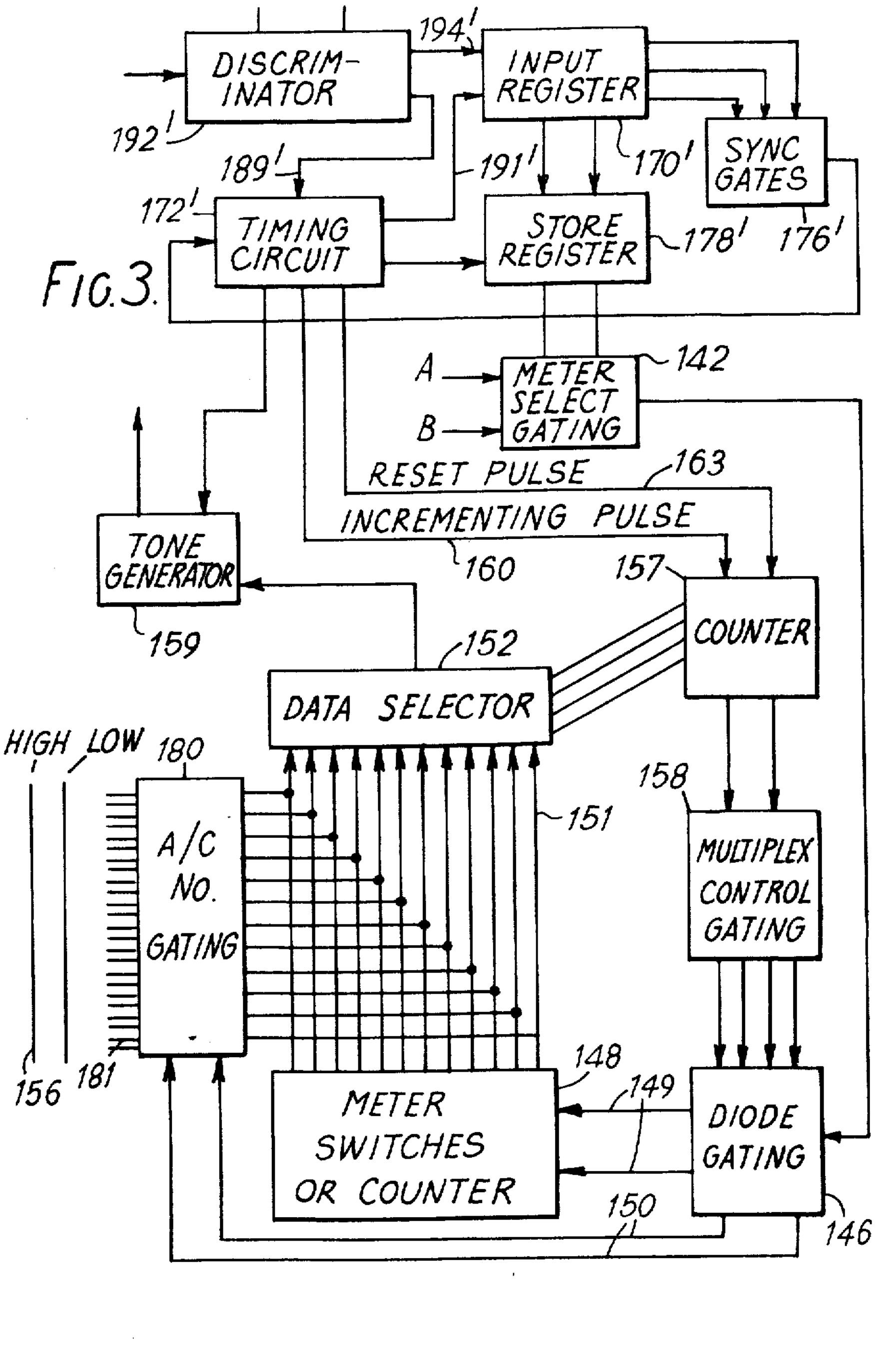
FIG. 3 is a schematic diagram of a reading logic module in the apparatus of FIG. 1.

The remote meter reading apparatus of FIGS. 1 to 3 forms part of a system for conveying the readings of a series of 256 meters at a remote station to an interrogator at a local telephone exchange. The remote station and the exchange are connected together via a telephone line. At the exchange, connection is made to a central data processor at the office of the supply company.

The interrogator at the exchange is in the form shown in FIGS. 2A and 4. The interrogator generates coded interrogation signals which are transmitted to the reading apparatus sequentially via the line. At the remote station the present apparatus is adapted, when supplied with the interrogation signals, to select a meter in accordance with the coding of the interrogation signals and to send back to the interrogator a coded response signal representative of the reading of the selected meter.

Referring to FIG. 1 of the drawings, the present apparatus includes a communications and regulator module 1 which is connected to the telephone line at the remote station. As described with reference to FIGS. 2A and 4 of application No. 14,638/71, the interrogator supplies frequency shift keyed (FSK) signals to the line, each signal being made up of a series of eight bursts of sinusoidal tones of either 1,000 or 1,300 Hz, representing a binary 0 or 1, respectively. For use with the present reading apparatus the interrogator is adapted to transmit three coded interrogation signals in sequence, the first two signals being coded with "route select" information and the third with "reading" information. The F.S.K. signals are supplied at 50 bauds.

In the module 1 circuits are provided for amplifying and squaring the incoming interrogation signals, which are then passed to a primary route selector 2. The module also includes a voltage regulator for deriving a stabilised 20V DC supply from a battery voltage applied to the telephone line at the exchange.

The primary route selector 2 has eight outputs, each of which has an associated secondary route selector 3 connected thereto. Route selector 2 is adapted, upon receiving one of the first interrogation signals, to provide a conductive path from the line to the output of the selector which is represented by the coded "route select" information in the signal.

Each route selector 3 also has eight outputs and connected to each of these are four reading logic modules 4. Each route selector 3 is adapted, upon receipt of one of the second interrogation signals, to provide a conductive path from the input thereof to that output which is represented by the coded information in the second signal.

Each reading logic module 4 is associated with a respective one of the 256 meters at the remote station. It is adapted, upon receiving one of the third interrogation signals coded with information representing the associated meter, to transmit information from that meter back to the central station via the module 1 and the line.

Referring now to FIG. 2 of the drawings, the communications and regulator module 1 is connected to an incoming line L from the local exchange, in parallel with a telephone handset TH. The module 1 includes a voltage regulator and trigger circuit 120 for regulating an input voltage which is continuously applied to the line by a battery at the exchange. An output of the voltage regulator 120 is connected via lines 121 to a power switch 122 and to a squaring circuit 190.

The squaring circuit 190 has an input connected to the line L, in parallel with the voltage regulator 120, and a data output connected to a discriminator 192 in the primary route selector module 2, as hereinafter described. A trigger output from the squaring circuit 190 is connected to power switch 122.

The voltage regulator 120 also includes a trigger circuit which is connected via line 133 to a further input of the power switch 122. Outputs from power switch 122 are connected to all circuits in the present apparatus.

In use, the voltage regulator 120 is continuously supplied with current from the battery at the local exchange, as mentioned above. As a result, the voltage regulator 120 and the squaring circuit 190, which is connected to the output of the regulator, are continuously energised.

When an interrogation signal is applied to the line L by the interrogator at the local exchange the first burst or bit in the signal is detected by the squaring circuit 190 and a pulse is applied from that circuit to the power switch 122. This causes the switch 122 to operate to cause an operating voltage from the voltage regulator 120 to be applied to all circuits in the present apparatus.

Whenever the voltage on the line L falls, due to the telephone handset TH being lifted and a substantial current being drawn, the drop in voltage is detected by the trigger circuit in the voltage regulator 120. A pulse is then applied from the trigger circuit via the line 133 to the power switch 122, disabling the switch 122 and rendering the apparatus inoperative.

Referring the FIG. 2 of the drawings, a discriminator 192 which is provided at the input of the primary route selector 2 has an input thereof connected to the output of the squaring circuit 190 in the communications and regulator module 1. Discriminator 192 is adapted to generate a binary signal corresponding to each squared interrogation signal from the squaring circuit 190. The binary signals are generated at an output of discriminator 192 which is connected via a data line 194 to an input register 170. Register 170 is an eight stage shift register.

For clocking signals from discriminator 192 into the input register 170 the discriminator is also adapted to generate clock pulses, as hereinafter described. The clock pulses are generated at an output of the discriminator 192 which is coupled via a line 189 to an input of a timing circuit 172. A line 191 connects an output of the timing circuit 172 to a clock input of input register 170.

A store register 178 is connected to the fourth, fifth and sixth stages of the input register 170 to receive data in these stages when the eight bit interrogation signal has been fully clocked into register 170. To this end synchronising gates 176 are connected to the first three stages of input register 170 to provide a trigger signal to a further input of timing circuit 172. A strobe output of circuit 172 is connected to a strobe input of store register 178.

Three output lines from the store register 178 are connected to a route decoder 193 and to power switching circuits 194. Route decoder 193 has eight outputs, each connected to a respective one of the eight secondary route selector modules 3, and power switching circuits 194 also have eight outputs, likewise connected to respective route selector modules 3.

Route decoder 193 has a further input which is connected directly via a line 195 to the output of the squaring circuit 190 in communications and regulator module 1.

When the first interrogation signal is transmitted over the line L from the local exchange the power switch 122 in the communications and regulator module 1 is operated by a pulse from the squaring circuit 190 in the manner described above. Power is then supplied to all circuits in the module 2.

The interrogation signal itself is amplified and squared in the squaring circuit 190 and is then applied to the input of discriminator 192 in the primary route selector module 2. Discriminator 192 generates a binary output signal on data line 194 and a clock pulse output on line 189 each time a squared, amplified version of a burst or bit of an interrogation signal is applied thereto.

Thus, when the first burst or bit of the first interrogation signal is applied to discriminator 192 a binary signal representing a 1 or an 0 condition, according to the frequency in that burst, is generated on data line 194. A short trigger pulse, generated by the leading edge of the binary signal, is provided on line 189 and is applied from that line to the trigger input of timing circuit 172. This causes the timing circuit 172 to generate a clock pulse which is applied to the clock input of register 170 via line 191 and clocks the first bit of the interrogation signal into the register.

The succeeding seven bits of the first interrogation signal are likewise clocked into the register 170, each by an associated clock pulse from timing circuit 172.

The first interrogation signal is an eight bit "route select" signal, as mentioned above. The first three bits in this signal form a code representing the route select function, the next three bits form a code representing a particular one of the eight secondary route select modules, and the last two bits are unused.

When the first eight bit interrogation signal has been loaded into the input register 170 the first three bits of the signal are in the final stages of the register to which the synchronising gates 176 are coupled. The gates 176 detect the presence of a coded signal representing the route select function in the final three stages of the register 170 and, upon detection, apply an output voltage level to the second trigger input of timing circuit 172. A pulse is then generated at the strobe output of the timing circuit 172 and is applied to the strobe input of the store register 178. This causes the three bits of the interrogation signal representing a particular output of route selector module 2 to be clocked into the store register 178 and from there applied to the route decoder 193 and power switching circuit 194. At the same time, further clocking of pulses into the input register 170 is inhibited by a counter mechanism in timing circuits 172.

In the route decoder 193 the three bits of the signal from the store register 178 are decoded and the decoder operates to provide a conductive path between the line 195 and output of the decoder which is represented by the three-bit signal. The three bits of the interrogation signal are likewise applied to the power switching circuits 194 and an electrical connection is made by these circuits between an OV line from the power switch 122 and the OV line to the appropriate route selector 3. This completes the power circuit from power switch 122 to the secondary routes selector 3, a −20V being permanently connected from switch 122 to all circuits in modules 2, 3 and 4.

Each of the secondary route selector modules 3 is connected to a respective one of the eight outputs of the route decoder 193 in route selector module 2 and to a respective one of the power switching circuits 194. The modules 3 are each constructed in the same manner as module 2 and each has eight outputs, as described above.

When the second "route select" interrogation signal is applied to the line L this signal is amplified and squared in the squaring circuit 190 of module 1 and is then applied directly via the line 195 to the route decoder 193 in module 2. From the route decoder 193 the signal travels to the secondary selector module 3 which has already been selected by the first interrogation signal.

The second interrogation signal, like the first, is an eight bit signal whose first three bits represent a "route select" function and whose second three bits represent a predetermined one of the eight outputs of the selected module 3. Within that module 3 the second interrogation signal is subjected to similar processing to that described above in connection with module 2 and, in the result, is routed to the predetermined output of module 3.

At the same time power is supplied to each of the four modules 4 connected to that output of module 3.

Referring now to FIG. 3 of the drawings, a discriminator 192' is provided at the input of each reading logic module 4 and is adapted to generate a binary signal corresponding to each coded interrogation signal applied to the module. This binary signal is generated at an output of discriminator 192' which is connected via a data line 194' to a data input of an input register 170'. Input register 170' is an eight stage shift register.

The discriminator 192'' is also adapted to generate clock pulses which are applied via a line 189' to a timing circuit 172'. An output of timing circuit 172' is connected by a line 191' to a clock input of the register 170'.

Synchronising gates 176' are connected to the first three stages in the input register 170' and an output from the gate is connected to a second trigger input of the timing circuits 172'. A strobe output of timing circuits 172' is connected to a strobe input of a store register 178', which is connected to the fourth and fifth stages in the input register 170'.

Discriminator 192', input register 170', timing circuits 172', store register 178' and synchronising gates 176' are adapted to operate in similar manner to discriminator 192, register 170, timing circuits 172, register 178 and gates 176, respectively, of FIG. 2.

In each reading logic module 4, output lines from the store register 178' are connected to a first pair of inputs of meter select gating 142. A second pair of inputs A and B of the gating 142 are maintained at voltages representative of the meter which is associated with the particular module 4. Gating 142 is enabled, as hereinafter described, when the voltages are applied thereto from store register 178' correspond to the voltages on inputs A and B.

Connected to the output of meter select gating 142 is diode gating 146 which has a pair of output lines 149 connected to block 148, representing switches on the associated meter, and a further pair of output lines 150 connected to account No. gating 180.

Each meter which is read by the present apparatus has six decimal reading digits. Associated with each of these digits are four sets of contacts, each movable between open and closed positions to provide a binary coded decimal representation of the associated digit. Twelve data lines 151 connect the switches in block 148 to a data selector 152.

For identification by the present apparatus each meter has a six-digit account number which, in use, is transmitted to the innterrogator at the exchange prior to transmission of the meter reading. For this purpose a group of four lines 181 is associated with each digit in the account number and each line is connected to one or other of a pair of high and low voltage lines 156. The voltages on the four lines provide therefore a binary digital code representative of the associated digit in the account number. All twentyfour of the lines 181 are connected to account number gating 180 which has twelve outputs connected to respective data lines 151.

To control the transmission of information from the meter switches 148 and the lines 181 to the interrogator a further output from timing circuit 172' is connected via an incrementing line 160 to a counter 157. Counter 157 has a first pair of outputs connected via multiplex control gating 158 to the diode gating 146. Four further outputs from the counter 157 are connected to the data selector 152.

The output of data selector 152 is connected to a tone generator 159 and the output of this generator is connected to the line L via a filter and drive circuit 162 in module 1 (see FIG. 2).

A clock output from timing circuit 172' is connected to tone generator 159 and a reset output is connected via line 163 to counter 157.

When the third interrogation signal, the "reading" signal, is applied to the line L the signal is amplified and squared in the squaring circuit 190 of module 1 and is then routed directly through primary route selector module 2 and one of the secondary route selector modules 3 to that output of the route selector module 3 which has been selected by the first two interrogation signals.

The third interrogation signal is an eight bit signal whose first three bits represent the "reading" function and whose next two bits represent a predetermined one of the four reading logic modules 4 which are connected to the selected output of the selected module 3.

Within each of the reading logic modules 4 connected to the selected module 3 the third interrogation signal is processed by the discriminator 192' and loaded into the input register 170' in similar manner to the loading of the first interrogation signal into register 170.

When the third interrogation signal has been loaded into register 170' the synchronising gates 176' detect the presence of the first three bits of the signal in the first three stages of the register. An output is then applied from the gates 176' to the timing circuit 172', which applies a strobe pulse to the strobe input of store register 178'. This causes the next two bits of the third interrogation signal to be fed to the store register 178' and from there to be applied to meter select gating 142.

The meter select gating 142 in each reading logic module 4 is only enabled when the voltages from the store register 178' of that module coincide with the voltages on the inputs A and B of the gating. These voltages are representative of the meter associated with that module 4, as described above. When there is coincidence a voltage is applied to enable diode gating 146.

As soon as the gating 146 is enabled an enabling voltage is applied from multiplex gating 158 to account number gating 180, via gating 146 and one of the lines 150. With gating 180 enabled voltages representing the first three digits in the account number are applied to respective lines 151. The voltage on the first of the lines 151 is applied via data selector 152 to the tone generator 159.

Timing circuit 172' now applies clock pulses to the tone generator 159 and the generator operates to transmit a tone signal representative of the voltage on the first line 151 to the interrogator at the exchange via filter and drive unit 162 in module 1 and the line L.

The timing circuit 172' then commences generating incrementing pulses which are applied via line 160 to the counter 157. From intermediate stages in the counter 157 a series of binary signals, each representing a respective one of the twelve data lines 151, is applied to data selector 152. When a signal representing a particular data line is applied to data selector 152 the voltage applied to that line from one of the lines 181 is gated via the data selector to the tone generator 159. The generator is then operated to transmit a tone signal representative of the voltage of the line 151 to the interrogator at the exchange, via filter and drive unit 162 in module 1 and the line L.

After twelve signals representing the first three digits in the account number have been transmitted there is a change in the two most significant voltage outputs of the counter 157. This asserts the next output of the multiplex control gating 158 which in turn operates account number gating 180 to connect voltages representing the next three digits in the account number to data lines 151. Signals representing these voltages are then transmitted serially from tone generator 159 in the manner described for the first three digits.

When the account number information has been transmitted the next output of the multiplex gating 158 is asserted to connect twelve sets of contacts in block 148 to respective lines 151. Voltages representing the conditions of these contacts, and hence the first three decimal reading digits of the meter, are then serially applied via data selector 152 to tone generator 159 in similar manner to that described above in connection with transmission of the account number. Tone signals representing the voltages are then transmitted to the interrogator, as described above.

After transmission of tone signals representing the first three digital readings the multiplex control gating 158 is again operated and information representing the next three digits is applied to lines 151 and then serially transmitted by tone generator 159.

After completion of transmission of information relating to the account number and meter reading the whole of the transmission cycle is repeated and then the timing circuit 172' resets, allowing further interrogation signals into the input register 170'.

If the interrogator at the local exchange now wishes to read another meter connected to the selected output of the selected secondary route selector module 3, it simply transmits another word containing the "read" instruction in the first three bits and a different meter select coding in the next 2 bits, provided this occurs immediately after the receipt of reply by the interrogator. Alternatively, if the interrogator wishes to read an altogether different meter connected to the apparatus it can again go through the above selection procedure.

When it has finished interrogating the apparatus, it will break contact after a time-out period.

It will be appreciated that the mechanical meter switches 148 can be replaced by an electronic counter incremented by electrical pulses from the meter.

It will be evident that the various modules forming the apparatus described above can be rearranged in different numbers and configurations for use in different applications. For example, 64 tertiary route selector modules can be connected one to each output of the secondary route selector modules 3 so as to enable up to 2,048 meters to be read. If desired, a still further stage of route selection can be introduced, provided that the total power drain from the telephone line thereby introduced does not exceed permitted limits.

Of course, the apparatus can be simplified to read only 32 meters by having a single route selector module connected directly to 32 meter reading logic modules.

The numbers of meters which the above-described configurations can read, i.e. 256, 2,048 and 32, respectively, are maxima only and intermediate numbers can be catered for simply by leaving out route selector modules and/or reading logic modules, as necessary.

Reading apparatuses can also be built up from the modules disclosed above for use in applications in which it is not desired to read a large number of meters. In the simplest form, where only a single meter is to be read, the two DC outputs from the communications and regulator module and the signal input and output will be wired permanently to a single reading logic module connected to an associated meter. If two to four meters are to be read, one reading logic module is used as a master and is permanently wired to a communications and regulator module. The master reading logic module monitors the line continuously, and when an instruction word is received, it decodes the three instruction bits at the start of the word and switches on all of the other reading logic modules. The interrogator then sends a second word which is received by all of the reading logic modules whereby the reading function is carried out. After completion of reading, denoted by an absence of signal, the master reading logic module deenergises the other reading logic modules.

It will be seen that an automatic meter reading system built up with reading apparatuses in accordance with the present invention will be extremely flexible. An individual reading apparatus for each remote station, which may be a single house, a number of houses, a block of flats, a process plant and so forth, can be constructed from standard modules wired together in a standard manner, the computer in the interrogator being programmed to send the appropriate instruction to each particular remote station in accordance with its configuration.

We claim:

1. Apparatus for reading sources of information connected thereto and for transmitting information from the sources to a remote interrogator in response to an interrogation signal, containing coded instructions from the interrogator, comprising:

a data transmission line;

route selector means remote from the interrogator and connected to the interrogator by said data transmission line, said route selector means having an input terminal electrically connected to said transmission line and a plurality of output terminals, and being for establishing an electrical path, upon receiving a first coded interrogation signal via said transmission line from the interrogator, from said input terminal to a particular one of said plurality of output terminals as directed by the coded instructions in said first interrogation signal;

at least one reading circuit means electrically connected to each of said plurality of output terminals of said route selector means, each reading circuit means having input means electrically connected to a respective one of the sources of information, for reading said information from a respective one of the sources selected in response to a third coded interrogation signal upon receiving said third coded interrogation signal from said interrogator via said route selector means;

means for generating a coded signal representative of the information of the source in response to said third coded signal; and coupling means independent of said route selector means for applying said generated coded signal to said transmission line.

2. Apparatus of claim 1 wherein said route selector means comprises:

a primary route selector gating means, having an input terminal and a plurality of output terminals;

a plurality of secondary route selector gating means each having an input terminal connected to a respective one of the said plurality of output terminals of said primary route selector gating means, and a plurality of output terminals;

said primary route selector gating means being for establishing an electrical path for a second coded interrogation signal, received from the interrogator via said transmission line, from said input terminal thereof to a respective one of said output terminals thereof as indicated by said first coded interrogation signal, upon receipt of said first interrogation signal from said interrogator thereby providing an electrical path from said input terminal of said primary route selector gating means to said input terminal of a respective one of said plurality of secondary route selector gating means; and said respective one of said plurality of secondary route selector gating means being for establishing an electrical path for said third interrogation signal from said input terminal thereof to a respective one of said output terminals thereof as indicated by said second coded interrogation signal, upon receipt of said second coded interrogation signal.

3. Apparatus of claim 1, wherein said route selector means comprises:

an input register means for receiving said first binary coded interrogation signal, consisting of binary bits, from said transmission line;

gating means having input means electrically connected to said input register, for selecting a first portion of said binary coded first interrogation signal, in response to the receipt of a second portion of said binary coded first interrogation signal in said input register;

route decoder means having second interrogation signal input means electrically connected to the input means of said route selector means and output means electrically connected to respective output terminals of the route selector means, and being for decoding said first portion of said first binary coded interrogation signal and electrically connecting said second interrogation signal input means to a respective one of said output terminals of said route selector means in response to the decoding of said first portion of said binary coded first interrogation signal; and means for transferring said first portion of said first binary coded interrogation signal from said input register to said route decoder means.

4. Apparatus of claim 2, wherein each said reading circuit means comprises:

encoder means connected to a source of information for encoding and transferring the information contained in the source upon receipt of a trigger signal;

source selector gating means for comparing said third coded interrogation signal with a signal representative of a source of data information and upon coincidence thereof providing said trigger signal to said encoder means;

generator means for receiving the information transferred from said encoder means and for generating a signal representative of the information; and coupling means independent of said route selector means, for transmitting said signal representative of said information to said transmission line.

5. Apparatus of claim 4, wherein each reading circuit means reads information representative of the identity of the source of the information as well as the information itself and provides an indicator signal to said generating means for generating a coded response signal representative of the source and the information.

6. Apparatus of claim 1, wherein said data transmission line comprises a telephone transmission line to a single telephone unit, and said route selector means is connected in parallel with said single telephone unit.

* * * * *